US012752244B2

(12) United States Patent
Darling et al.

(10) Patent No.: US 12,752,244 B2
(45) Date of Patent: Oct. 6, 2026

(54) CROSS-LINKED MINERAL MEMBRANES

(71) Applicant: UCHICAGO ARGONNE, LLC, Chicago, IL (US)

(72) Inventors: Seth B. Darling, Berwyn, IL (US); Zijing Xia, Chicago, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 690 days.

(21) Appl. No.: 17/957,033

(22) Filed: Sep. 30, 2022

(65) Prior Publication Data

US 2024/0109040 A1 Apr. 4, 2024

(51) Int. Cl.
*B01D 69/12* (2006.01)
*B01D 67/00* (2006.01)
*B01D 71/02* (2006.01)

(52) U.S. Cl.
CPC ....... *B01D 69/125* (2013.01); *B01D 67/0044* (2013.01); *B01D 67/0069* (2013.01); *B01D 67/0076* (2013.01); *B01D 71/027* (2013.01); *B01D 2323/30* (2013.01); *B01D 2323/40* (2013.01)

(58) Field of Classification Search
None
See application file for complete search history.

(56) References Cited

U.S. PATENT DOCUMENTS

| | | |
|---|---|---|
| 8,110,517 B2 | 2/2012 | Kerres et al. |
| 2005/0048341 A1 | 3/2005 | Kurano et al. |
| 2007/0191527 A1 | 8/2007 | Mallikarjuna et al. |

FOREIGN PATENT DOCUMENTS

| | | | |
|---|---|---|---|
| DE | 102015210395 A1 * | 12/2016 | ............. B01J 47/12 |

OTHER PUBLICATIONS

Becker et al, Epoxy Layered Silicate Nanocomposites, Adv Polym Sci (2005) 179: 29-82. (Year: 2005).*

Kun Huang, PhD Thesis, University of Manchester. School of Chemical Engineering and Analytical Science (Year: 2019).*

Liu, et al., "Montmorillonite Membranes with Tunable Ion Transport by Controlling Interlayer Spacing," ACS Applied Materials & Interfaces 15(49), pp. 57144-57152 (2023).

Xia, et al., "Tunable Ion Transport with Freestanding Vermiculite Membranes," ACS Nano 16(11), pp. 18266-18273 (2022) (25 page manuscript provided).

Bachman, et al., "Enhanced ethylene separation and plasticization resistance in polymer membranes incorporating metal-organic framework nanocrystals," Nature Materials 15, pp. 845-849 (2016).

Freeman, et al., "Maximizing the right stuff: The trade-off between membrane permeability and selectivity," Science 356(6343):eaab0530, 11 pages (2017).

Geim & Grigorieva, "Van der Waals heterostructures," Nature 499, pp. 419-425 (2013).

Huang, et al., "Cation-controlled wetting properties of vermiculite membranes and its promise for fouling resistant oil-water separation," Nature Communications 11:1097, 10 pages (2020).

(Continued)

*Primary Examiner* — Krishnan S Menon

(74) *Attorney, Agent, or Firm* — Foley & Lardner LLP

(57) ABSTRACT

A mineral membrane and method of making the same are disclosed. The mineral membrane may be made by exfoliating a mineral material to produce a membrane, and cross-linking the membrane.

10 Claims, 11 Drawing Sheets

(56) References Cited

OTHER PUBLICATIONS

Lee, et al., "Membrane materials for water purification: design, development, and application," Environmental Science: Water Research & Technology 2(1), pp. 17-42 (2016).
Li, et al., "Preparation and application of expanded and exfoliated vermiculite: A critical review," Chemical Physics 550:111313, 15 pages (2021).
U.S. Geological Survey, "Mineral Commodity Summaries 2020," retrieved from https://pubs.usgs.gov/periodicals/mcs2020/mcs2020.pdf, 200 pages (2020).
Akomah, et al., "A Review on Current Trends in Heavy Metal Removal from Water between 2000-2021," International Journal of Environment and Climate Change 11(12), pp. 67-90 (2021).
Baloyi, et al., "Synthesis and application of pillared clay heterogeneous catalysts for wastewater treatment: a review," RSC Advances 8(10), pp. 5197-5211 (2018).

* cited by examiner

CROSS-LINKED MINERAL MEMBRANES

CROSS-LINKED MINERAL MEMBRANES

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to a membrane and method of producing the same. More specifically, the present disclosure describes a cross-linked mineral membrane and method of producing the same.

BACKGROUND

With rapid industrialization and rising concerns such as wastewater reuse, membranes exhibiting selective transport to ions and small molecules are in high demand because of various advantages including low cost, low energy input, environmental friendliness, and high separation efficiency. However, commercially available membranes often fail to deliver adequate selectivity without sacrificing permeability and generally have poor tunability.

One studied method to improve both permeability and selectivity includes using molecular sieving fillers with nano-structuring such as 2-dimensional ("2D") nanosheets. Such 2D structure is advantageous because transport channels between the layers is determined by spacing, charge, and chemistry of the materials used. In other words, the transport process is tunable.

2D materials considered in previous studies include graphene family, 2D chalcogenides, hydroxides, and clays. Graphene family includes, without limiting, graphene, hexagonal boron nitride, boron-carbon-nitrogen systems, fluorographene, and graphene oxide. 2D chalcogenides include, without limiting, molybdenum disulfide ($MoS_2$), tungsten disulfide ($WS_2$), molybdenum diselenide ($MoSe_2$), and tungsten diselenide ($WSe_2$) whereas hydroxides include, without limiting, nickel(II) hydroxide $Ni(OH)_2$ and europium(II) hydroxide ($Eu(OH)_2$).

Despite their advantages including low cost, simple exfoliation process, high thermal and mechanical stability, and environmental friendliness, phyllosilicate minerals are not widely studied for membranes.

For example, clays are naturally occurring 2D layered inorganic materials, classified into two groups according to the stacking organization of tetrahedral and octahedral layers. Alternating layers of tetrahedral Si-based and octahedral Al-based sheets held together by hydrogen bonding are categorized as 1:1; two tetrahedral Si-based sheets sandwiching one octahedral Al-based sheet represent the 2:1 case. Different clays present different species at the interlayers, and consequently different degrees of bonding forces between the layers.

As another example, vermiculite is a 2:1-type phyllosilicate produced at a scale of >100,000 tons/yr. The layered structure of vermiculite consists of octahedral sheets containing magnesium ions flanked by two tetrahedral silicate layers. Neighboring stacks are held together by electrostatic and van der Waals forces. That is, a layer of exchangeable hydrated magnesium cations exists within the interlayer space to compensate for the excess negative charges created by isomorphous substitution of $Si^{4+}$ by $Al^{3+}$ in the tetrahedrons. Although vermiculite has been used industrially for decades, exfoliation into its constituent sheets and reassembly for membrane applications has rarely been reported.

Starting several years ago, vermiculite membranes have been studied in Li—S batteries, power generation, proton conduction, catalysis, and resource recovery, and only very recently have researchers begun to explore their potential for precise ion or molecular separations. Once vermiculite is exfoliated and the nanosheets are restacked by vacuum filtration, the resulting membrane has good mechanical properties, but poor water stability. Soaking these materials for periods of several days results in delamination. Thus, previously studied vermiculite membranes are not suitable for certain applications due to their poor water stability.

SUMMARY

Certain embodiments described herein relate generally to a cross-linked mineral membrane. The membrane is made by exfoliating the mineral membrane to produce a membrane, and cross-linking the membrane with a crosslinker.

Certain embodiments described herein relate generally to a method of making a cross-linked mineral membrane. The method comprises exfoliating a mineral material to produce a membrane and cross-linking the membrane with a crosslinker.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are not, therefore, to be considered limiting of its scope, the disclosure will be described with additional specificity and detail through use of the accompanying drawings.

FIG. 3A is a photograph of the membrane as produced, FIG. 3B is a photograph of the membrane immersed in water, and FIG. 3C is a photograph of the membrane that has been immersed in water for 20 minutes.

FIG. 4A is a photograph of the membrane as produced and immersed in water, FIGS. 4B and 4C are photographs of the membrane that has been immersed in water for 1 week.

Figure 5A:
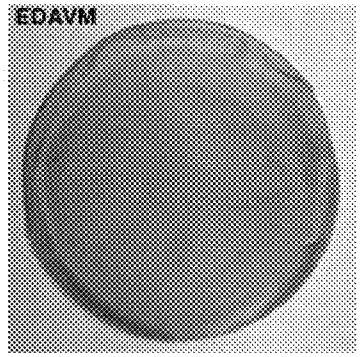
FIGS. 5A-5C are photographs of vermiculite membranes crossed with different diamines according to one embodiment of the present disclosure, where the membrane of FIG.
Figure 5B:
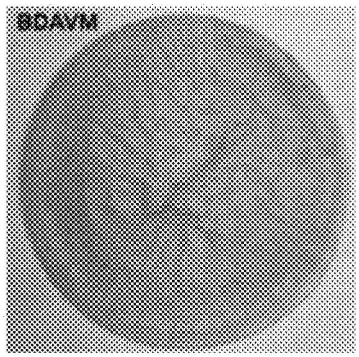
Figure 5C:
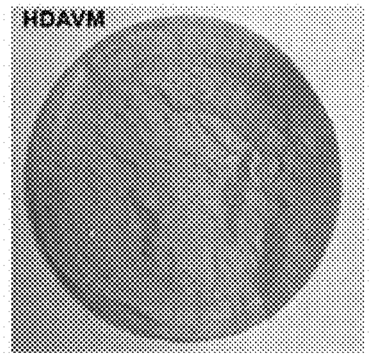

5A is cross-linked with ethylenediamine, the membrane of FIG. 5B is cross-linked with butanediamine, and the membrane of FIG. 5C is cross-linked with hexanediamine.

Figure 6A:
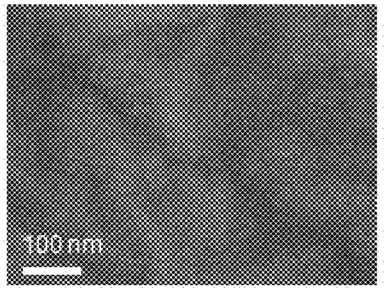
Figure 6B:
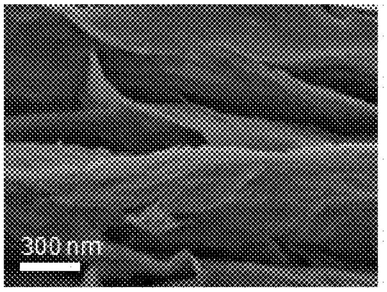
Figure 6C:
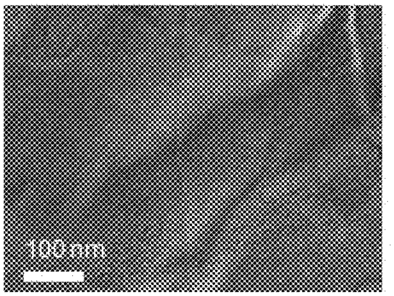
Figure 6D:
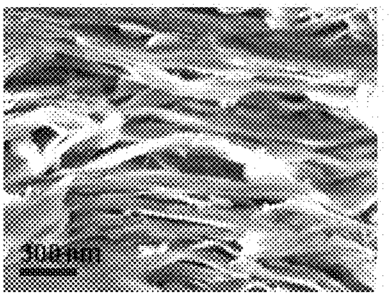
Figure 6E:
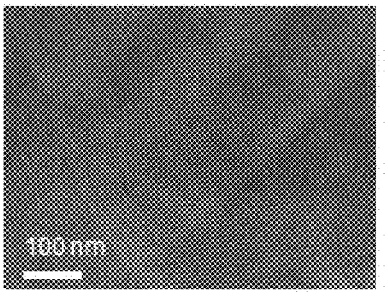
Figure 6F:
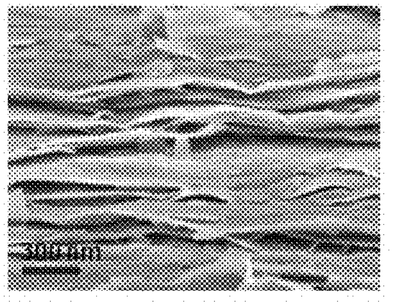
Figure 6G:
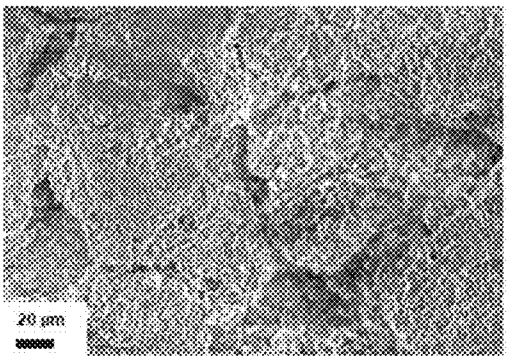
Figure 6H:
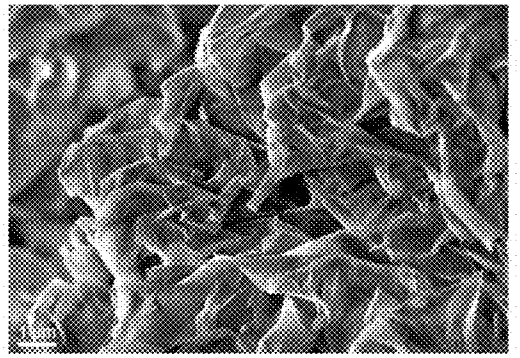

FIGS. 6A-6H are top view and cross-sectional images of vermiculate membranes cross-linked with different diamines according to one embodiment of the present disclosure. Specifically, FIGS. 6A and 6B show top view and cross-sectional images of vermiculate membrane cross-linked with ethylenediamine, respectively, FIGS. 6C and 6D show top view and cross-sectional images of vermiculate membrane cross-linked with butanediamine, respectively, FIGS. 6E and 6F show top view and cross-sectional images of vermiculate membrane cross-linked with hexanediamine, respectively, and FIGS. 6G and 6H show top view and cross-sectional images of vermiculate membrane cross-linked with diaminodecane.

Figure 7:
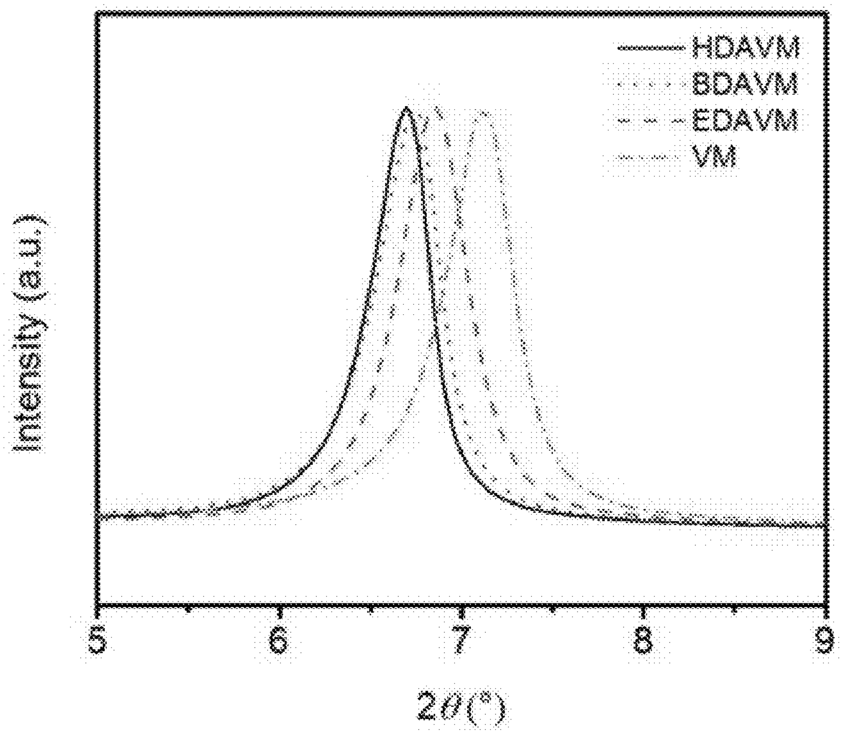

FIG. 7 show different interlayer spacing of the vermiculate membranes cross-linked with different diamines in dry state according to one embodiment of the present disclosure.

Figure 8:
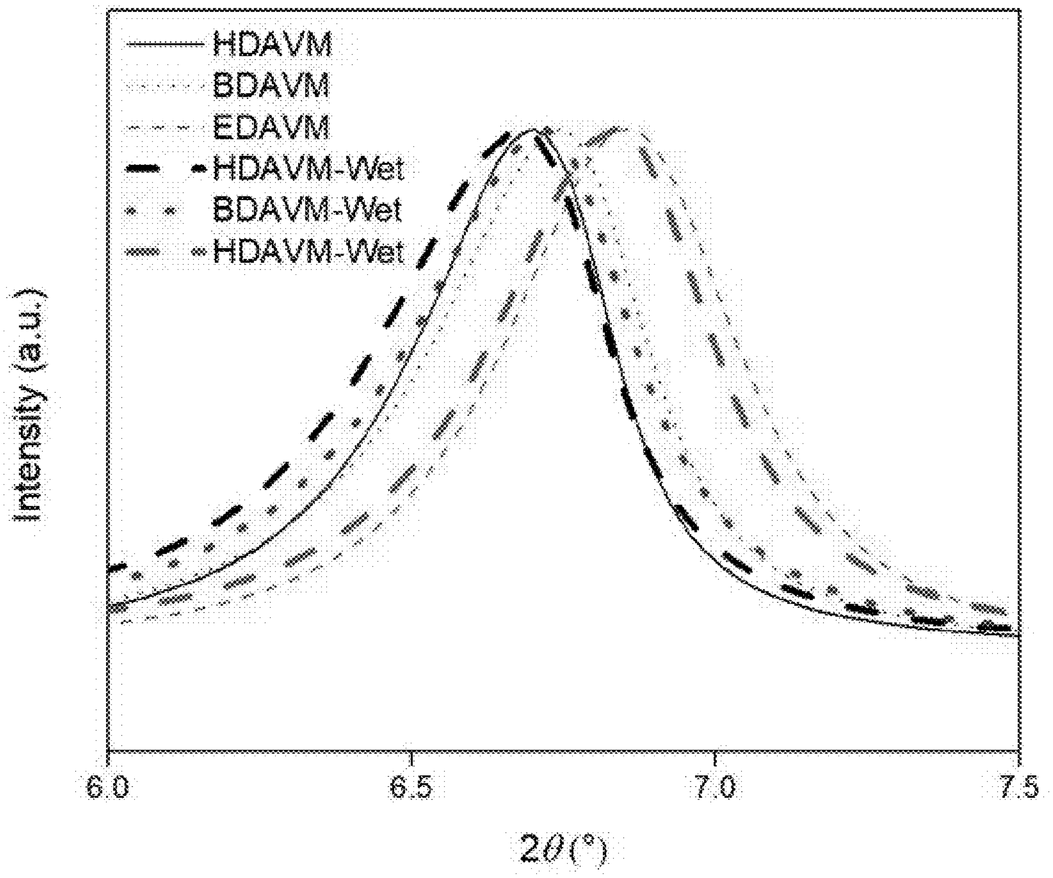

FIG. 8 show different interlayer spacing of the vermiculate membranes cross-linked with different diamines in wet state according to one embodiment of the present disclosure.

Figure 9:
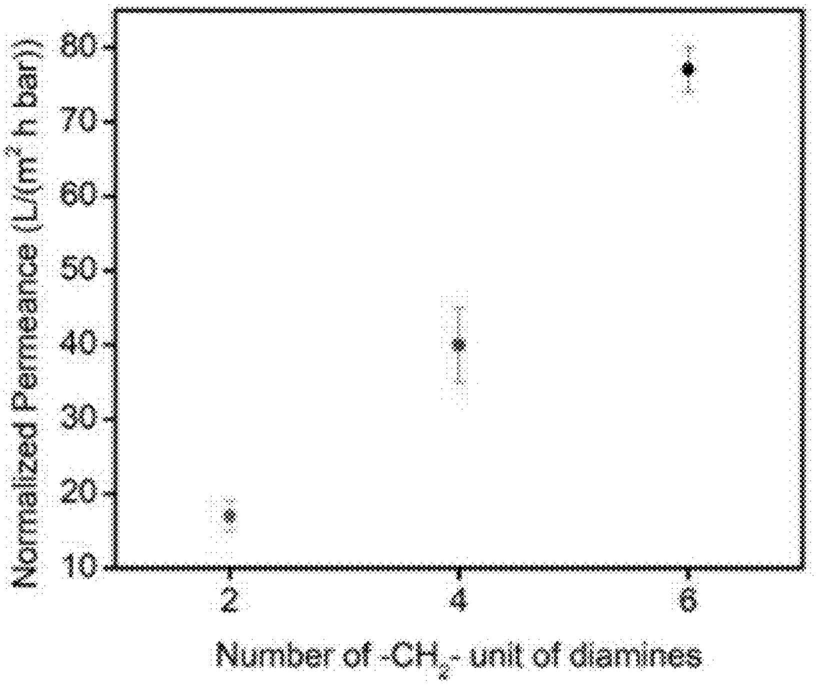

FIG. 9 shows a correlation between the number of carbon chain units of diamines and water flux of the resulting cross-linked membrane.

Figure 10A:
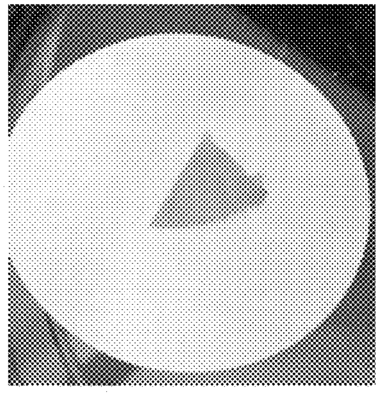
Figure 10B:
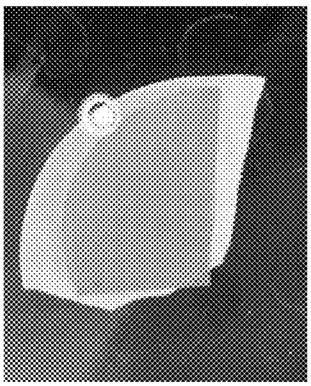
Figure 10C:
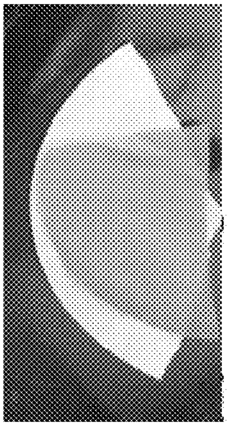
Figure 10D:
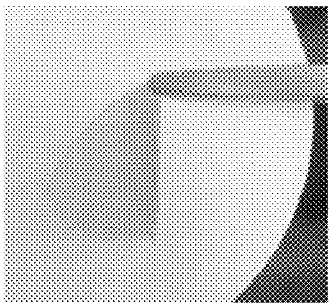

FIGS. 10A-D are photographs of the vermiculate membrane cross-linked with hexanediamine according to one embodiment of the present disclosure, FIG. 10A is the photograph of the membrane as produced, FIG. 10B is the photograph of the membrane after having been immersed in water for 150 hours, FIG. 10C is the photograph of the membrane after having been immersed in 0.1M KCl for 150 hours, and FIG. 10D is the photograph of the membrane after having been immersed in 0.1M KCl for 60 days.

Figure 11A:
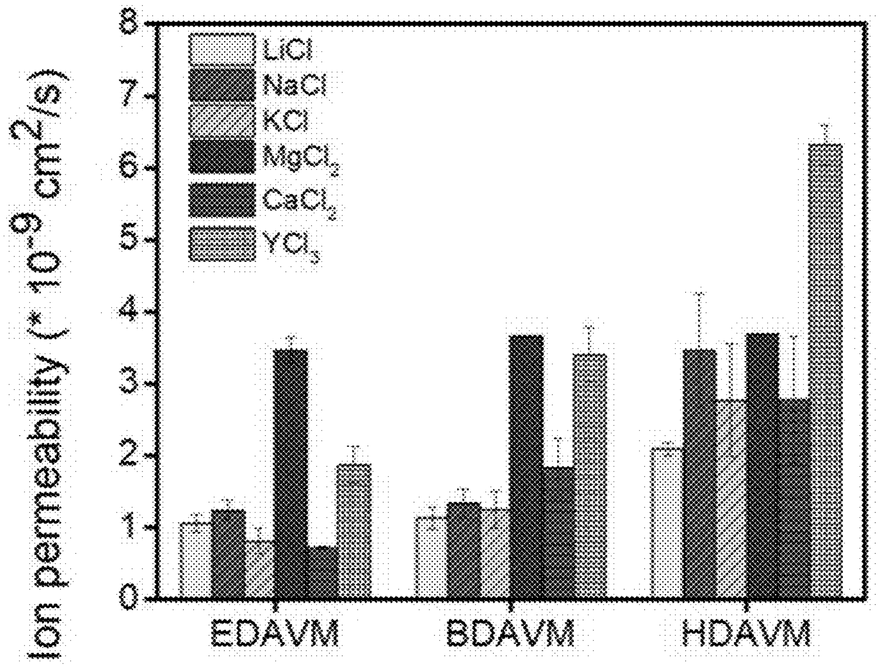
Figure 11B:
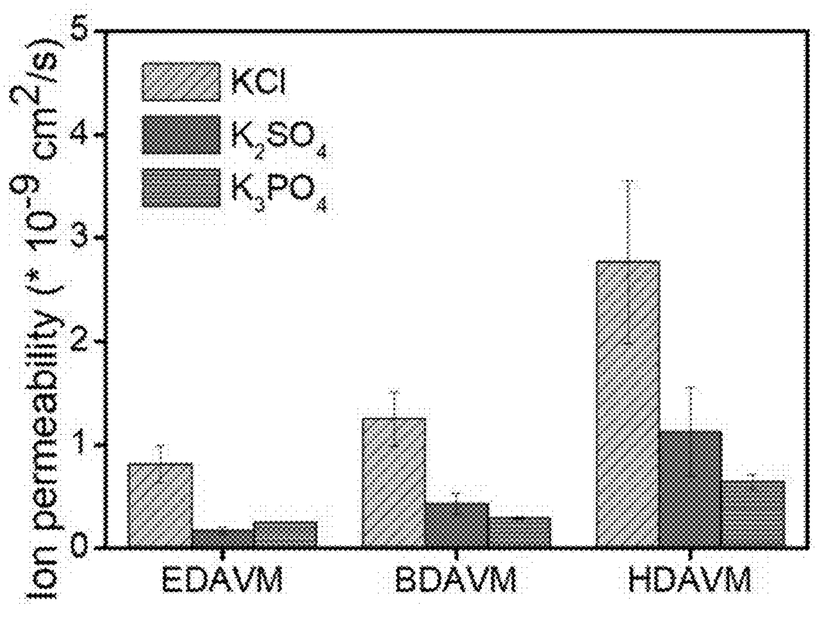

FIGS. 11A and 11B are comparisons of cation permeability and anion permeability, respectively, of the vermiculite membranes cross-linked with different diamines according to one embodiment of the present disclosure.

FIGS. 12A-D show the x-ray photoelectron spectroscopy spectra ("XPS") of the membranes for N 1s, depth profiling of the membranes, XPS spectra of the membranes for Al 2p, and XPS spectra of the membranes for O 1s, respectively.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

As used herein "room temperature" shall mean temperatures within 15 to 40° C.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Figure 1A:
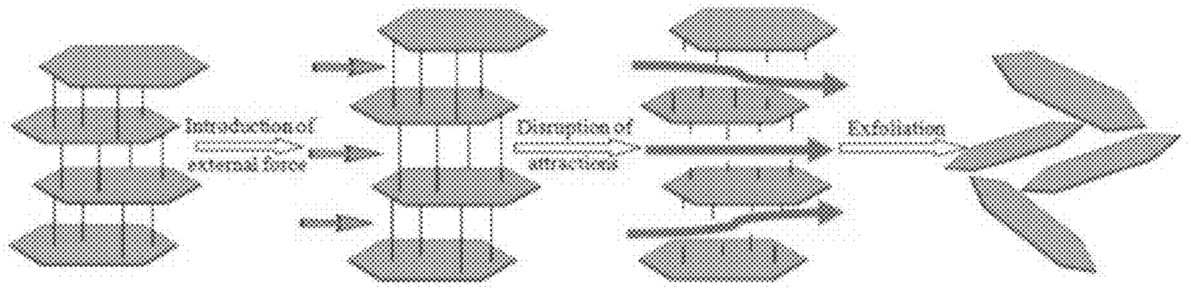
FIGS. 1A-1B are photographs of the freestanding membrane prior to cross-linking.

In one embodiment, a mineral membrane is produced by exfoliating a mineral material to produce a membrane, and cross-linking the free membrane. In one embodiment, exfoliating the mineral material and preparing the membrane may include the steps of: refluxing the mineral material in saturated NaCl solution, refluxing the mineral material in a LiCl solution, sonicating and centrifuging the mineral material, and vacuum filtrating the mineral material. FIG. 1A illustrates schematics of the process.

In one embodiment, the mineral material may be phyllosilicate mineral, preferably vermiculite. The bulk vermiculite was exfoliated by the ion-exchange process. In one embodiment, 100-500 mg of bulk vermiculites was added into 500 mL of saturated sodium chloride (NaCl) solution and stirred under reflux. Reflux may be carried out at a temperature between 80 and 100° C. for 24 to 48 hours to replace the interlayer Mg2+ cations with Na+. While it is preferred that the thermal treatment is combined with refluxing, a person of ordinary skill in the art would easily understand that the thermal treatment may be carried out as a separate processing step (e.g. thermally pre-treating the mineral material). In one embodiment, the NaCl solution was refluxed at 100° C. for 24 hours. The solution may be filtered, and then the sediment may further be rinsed repeatedly with deionized (DI) water and ethanol in sequence to remove the remaining salt.

Then, the bulk vermiculate refluxed in the saturated NaCl solution may be refluxed in lithium chloride (LiCl) solution, allowing ion exchange of Na+ ions to Li+ ions. In some embodiments, the reflux in LiCl solution may be carried in LiCl solution with a concentration ranging between 1M-5M. In one preferred embodiment, the reflux in LiCl solution may be carried in 2M LiCl solution. The concentration of solution presented herein is exemplary only, and a person of ordinary skill in the art may adopt any concentration that is considered suitable.

The refluxed bulk vermiculite may be further sonicated and centrifuged to apply external forces and disrupt the electrostatic and van der Waals forces that are holding vermiculite layers together. Alternatively, the electrostatic and van der Waals forces may be disrupted chemically, e.g. using hydrogen peroxide. A person of ordinary skill in the art may adopt any method that is considered suitable. Once attractions between the layers are weakened, the vermiculite may be exfoliated. By vacuum filtrating or casting the exfoliated layers, a membrane may be produced. In one embodiment, the produced membrane may be freestanding. In other embodiments, the produced membrane may be deposited or transferred onto a porous support. The porous support may be a polymer membrane, ceramic membrane, or a polymer-ceramic membrane.

Figure 1B:
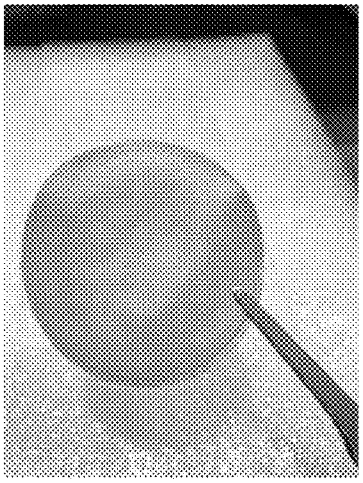

FIG. 1B is a photograph of a freestanding membrane made in accordance to the method described above. Specifically, the as-prepared sodium vermiculite was dispersed in 500 mL 2M LiCl aqueous solution. The as-obtained mixture was kept at 100° C. under continuous magnetic stirring for 24 hours to further replace the interlayer Na+ with Li+ cations. The mixture was then cooled down to room temperature. After the cleaning procedure, the lithium vermiculite flakes were sonicated in water for 1 hour to exfoliate them into monolayer lithium vermiculite nanosheets. Low-speed centrifugation at 3000 rpm was applied for 20 minutes to remove the multilayer vermiculite nanosheets and other bulk residues. The rotor speed results in different mass of the residue, higher-speed centrifugation resulting in heavier residue. It is desirable to obtain lightweight residue such that vermiculite monolayer nanosheets float to the top of the solution. For this reason, low-speed centrifugation is preferred. A person of ordinary skill in the art would understand that the processing conditions described herein are exemplary only and may be modified as considered suitable.

Figure 2A:
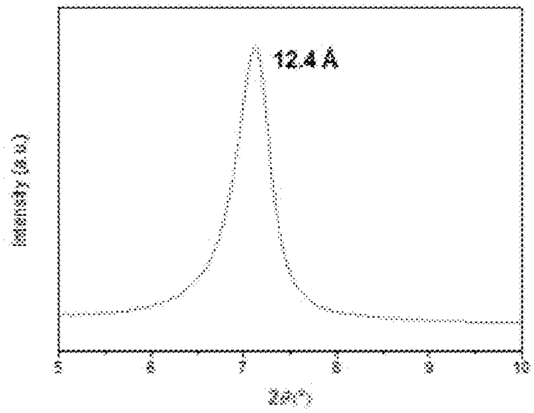
FIGS. 2A and 2B are characterization of 2-dimensional vermiculite nanosheets, FIG. 2A showing the interlayer spacing of the vermiculate nanosheet and FIG. 2B showing the average thickness of the vermiculite nanosheet.
Figure 2B:
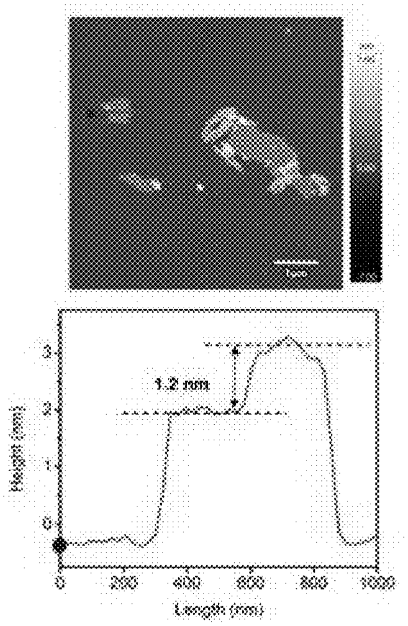

FIGS. 2A and 2B are characterization of 2-dimensional vermiculite nanosheets. As can be seen in FIG. 2A, the interlayer spacing of 2-dimensional vermiculite nanosheets is approximately 12.4 Å. Furthermore, vermiculite flakes with one layer has the average thickness of approximately 1.2 nm, and every additional layer adds approximately the same thickness. That is, vermiculite flakes with two layers have the average thickness of approximately 2.4 nm, whereas the flakes with three layers have the average thickness of approximately 3.6 nm.

Figure 3A:
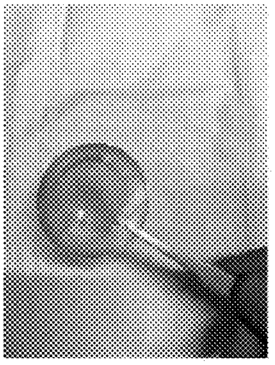
FIGS. 3A-3C are photographs of the freestanding membrane prior to cross-linking immersed in water. Specifically.
Figure 3B:
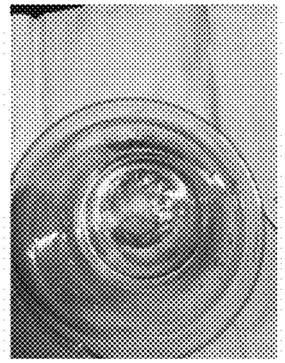
Figure 3C:
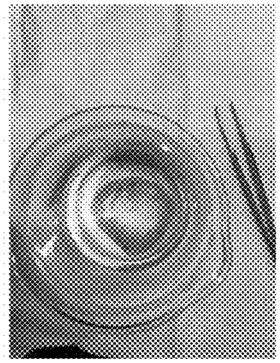

FIGS. 3A-3C are photographs of the freestanding vermiculite membrane made in accordance with one embodiment described above, prior to cross-linking. Specifically, FIG. 3A is a photograph of the membrane as produced, prior to cross-linking. FIG. 3B is a photograph of the membrane immediately after it is immersed in water, and FIG. 3C is a photograph of the membrane after having been immersed in water for 20 minutes. While the vermiculite membrane is stable in hydrocarbons such as kerosene, as can be seen in FIG. 3C, the membrane without cross-linking dissolves quickly in water. That is, the vermiculite membrane without cross-linking exhibits low stability in aqueous environments.

To further modify the interlayer spacing to control the ion-transport properties through the membrane and enhance the water stability of vermiculite membranes, different crosslinkers were applied. To precisely control and compare the effect of the crosslinker, 1,2-ethanediamine, 1,4-butanediamine, and 1,6-hexanediamine were chosen as the crosslinkers. After the diluted vermiculite nanosheet solution was obtained following the 2.1 exfoliation process, 50 mg of crosslinker was dropped into the 50 mL solution and followed by a sonication process for 1 hour. The crosslinked vermiculite nanosheet solution were filtered through a polyvinylidene fluoride substrate and peeled off to obtain freestanding ethylenediamine-crosslinked vermiculite membrane ("EDVM"), butanediamine-crosslinked vermiculite membrane ("BDVM"), and hexanediamine-crosslinked vermiculite membrane ("HDVM"). Various organic molecules such as diamines, diimides, polyimides, dithiols, and any others that may be used in Sonogashira coupling, which can chelate with metal ions to cross-link 2-dimensional materials layers, may be used to from crosslinks and stabilize the membrane material. In some embodiments, a vermiculite membrane may be cross-linked with diamines such as ethylenediamine, butanediamine, and hexanediamine. Further in one embodiment, a crosslinker such as diamine may be introduced into the suspension prior to vacuum filtration, that is, prior to the formation of the membrane, to bind adjacent sheets to each other in the membrane. In other embodiments, the crosslinker may be introduced into the suspension after the membrane is formed.

Figure 4A:
FIGS. 4A-4C are photographs of the cross-linked freestanding membrane according to one embodiment of the present disclosure, immersed in water. Specifically.
Figure 4B:
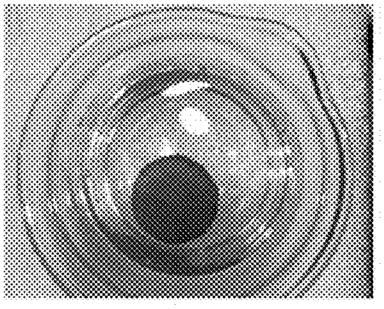
Figure 4C:
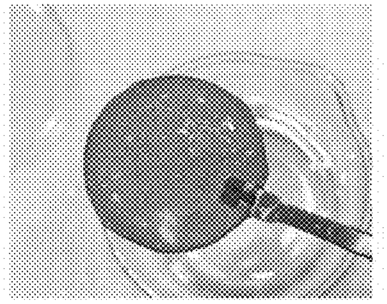

FIGS. 4A-4C are photographs of the cross-linked freestanding membrane according to one embodiment of the present disclosure, immersed in water. Specifically, FIG. 4A is a photograph of the vermiculite membrane cross-linked with ethylenediamine immediately after having been immersed in water. FIGS. 4B and 4C are photographs of the vermiculite membrane cross-linked with ethylenediamine after having been immersed in water for 1 week. As can be seen from FIGS. 4B-C, the cross-linked vermiculite membrane does not dissolve in water, thereby exhibiting improved stability in aqueous environments.

FIGS. 5A-5C are photographs of vermiculite membranes crossed with different diamines according to one embodiment of the present disclosure, where the membrane of FIG. 5A is cross-linked with ethylenediamine, the membrane of FIG. 5B is cross-linked with butanediamine, and the membrane of FIG. 5C is cross-linked with hexanediamine.

FIGS. 6A-6H are top view and cross-sectional images of vermiculate membranes cross-linked with different diamines according to one embodiment of the present disclosure. Specifically, FIGS. 6A and 6B show top view and cross-sectional images of vermiculate membrane cross-linked with ethylenediamine, respectively, FIGS. 6C and 6D show top view and cross-sectional images of vermiculate membrane cross-linked with butanediamine, respectively, FIGS. 6E and 6F show top view and cross-sectional images of vermiculate membrane cross-linked with hexanediamine, respectively, and FIGS. 6G and 6H show top view and cross-sectional images of vermiculate membrane cross-linked with diaminodecane.

As can be seen from FIGS. 6A, 6C, and 6E, cross-linking a vermiculite membrane with diamines having two to six carbon chains allow formation of a membrane with relatively smooth surface morphology. Further, as can be seen from FIGS. 6B, 6D, and 6F, forming cross-links within sheets using diamines lead to layer stacking when forming a membrane. However, as can be seen from FIGS. 6G-H, cross-linking with diaminodecane led to crumpling than layer stacking. That is, while cross-linking with various diamines allows membrane tunability, crosslinking with diamine that has long carbon chains, e.g. 10-C diamine, may lead to certain characteristics such as surface morphology, that is undesirable for certain applications. While cross-linking a vermiculite membrane with diamine having long carbon chains may not be desirable for certain applications including Li—S batteries, power generation, proton conduction, catalysis, and resource recovery, such membrane may still be valuable for other applications.

FIGS. 7-8 further illustrate tenability based on diamine used for cross-linking. Specifically, FIGS. 7-8 show different interlayer spacing of the vermiculate membranes cross-linked with different diamines in dry state and in wet state, respectively. The measured interlayer spacing of pure vermiculite membrane that is not cross-linked, the vermiculite membrane cross-linked with ethylenediamine, the vermiculite membrane cross-linked with butanediamine, and the vermiculite membrane cross-linked with hexanediamine are summarized in table below.

| Material | Dry d spacing (Å) | Wet d spacing (Å) |
|---|---|---|
| Pure VM | 12.40 | / |
| EDA + VM | 12.87 | 12.91 |
| BDA + VM | 13.10 | 13.14 |
| HDA + VM | 13.18 | 13.22 |

As can be seen above, the interlayer spacing between layers increases as the number of —$CH_2$ units of cross-linking diamines increases regardless of whether the membrane is in a dry state or in a wet state. That is, the vermiculite membrane cross-linked with hexanediamine has greater interlayer spacing than a pure vermiculite membrane or the vermiculite membrane cross-linked with ethylenediamine or butanediamine. When compare the interlayer spacing in a dry state and in a wet state, interlayer spacing increases, but only slightly, e.g. approximately 0.04 Å. This result demonstrates that the cross-links form bonds between the layers to maintain the substantially same spacing even when a membrane is hydrated. Furthermore, as will be described further below, varying the interlayer spacing directly affects the transport properties of a membrane.

FIG. 9 shows a correlation between the number of —$CH_2$ units of diamines and water flux of the resulting cross-linked membrane. As shown in FIG. 9, as the number of —$CH_2$ units of cross-linking diamines increases, the water permeability increases. For example, the normalized water flux of the membrane cross-linked with hexanediamine is more than 400% compared to that of the membraned cross-linked with ethylenediamine. Ion transportability can also be tuned in a similar manner. Thus, the selection of different cross-linking diamines allows tuning of the membrane properties as desired.

FIGS. 10A-D are photographs of the vermiculate membrane cross-linked with hexanediamine according to one embodiment of the present disclosure. Specifically, FIG. 10A is the photograph of the membrane cross-linked with hexanediamine as produced, having the thickness of 13 μm. FIG. 10B is the photograph of the membrane crossed with hexanediamine that has been immersed in water for 150 hours. The thickness of the membrane after immersion in water for 150 hours remained at 13 μm. That is, the vermiculate membrane according to one embodiment of the present disclosure exhibits excellent stability in aqueous environments. The membrane has also been tested in 0.1M KCl. After having been immersed in 0.1M KCl for 150 hours, the thickness of the membrane cross-linked with hexanediamine decreased slightly to 10 μm. However, after having been immersed in 0.1M KCl for 60 days, the thickness of the membrane has remained at 10 μm. That is, the cross-linked membrane, in addition to stability in aqueous environments, exhibit excellent stability in electrolyte.

The FIGS. 11A and 11B show comparisons of cation permeability and anion permeability, respectively, of the vermiculite membranes cross-linked with different diamines according to one embodiment of the present disclosure. FIG. 11A shows cation permeability of the vermiculite membrane cross-linked with ethylenediamine, butanediamine, and hexanediamine using lithium chloride (LiCl), sodium chloride (NaCl), potassium chloride (KCl), yttrium chloride ($YCl_3$), calcium dichloride ($CaCl_2$)) and magnesium chloride ($MgCl_2$). When cations pass through the nanochannels of the membrane, the negatively charged nanosheets have strong electrostatic interactions upon them when the channel scale is approximately the Debye length. In one embodiment, the Debye length may be approximately 1 nm in this system. A person skilled in the art would easily understand that the Debye length may vary depending on the ionic strength for each electrolyte.

As shown in FIG. 11A, the ion permeability of individual cations for different vermiculite membranes cross-linked with various diamines follows the trend of decreasing permeability as the length of the carbon chain of the crosslinker decreases. That is, the membrane cross-linked with hexanediamine has greater permeability than the membrane cross-linked with butanediamine. The membrane cross-linked with butanediamine has greater permeability than the membrane cross-linked with ethylenediamine. The permeability difference between the ethlyenediamine-crosslinked membrane and the butanediamine-crosslinked membrane is smaller than that between the butanediamine-crosslinked membrane and the hexanediamine-crosslinked membrane. Compared to monovalent cations, $Mg^{2+}$ passes through the nanochannel more readily due to stronger attraction to the negatively charged membranes according to the Donnan effect. Trivalent cations $Y^{3+}$ exhibit lower permeability in the membranes with tight spacing, e.g. in ethylenediamine-crosslinked membrane, due to steric hindrance and higher permeability in those with a larger spacing, e.g. hexanediamine-crosslinked membrane due to Donnan attraction. The butanediamine cross-linked membrane, between these two extremes, exhibits moderate permeability in between.

FIG. 11B compares anion permeability of the vermiculite membranes cross-linked with ethylenediamine, butanediamine, and hexanediamine using potassium chloride (KCl), potassium sulfate ($K_2SO_4$) and potassium phosphate ($K_3PO_4$). As can be seen in FIG. 11B, ion permeability decreases in the order of $Cl^-$, $SO_4^{2-}$, and $PO_4^{3-}$. In addition, ion permeability decreases as the number of —$CH_2$ units in cross-linking diamines increases. This result can be explained by the size exclusion effect.

Figure 12A:
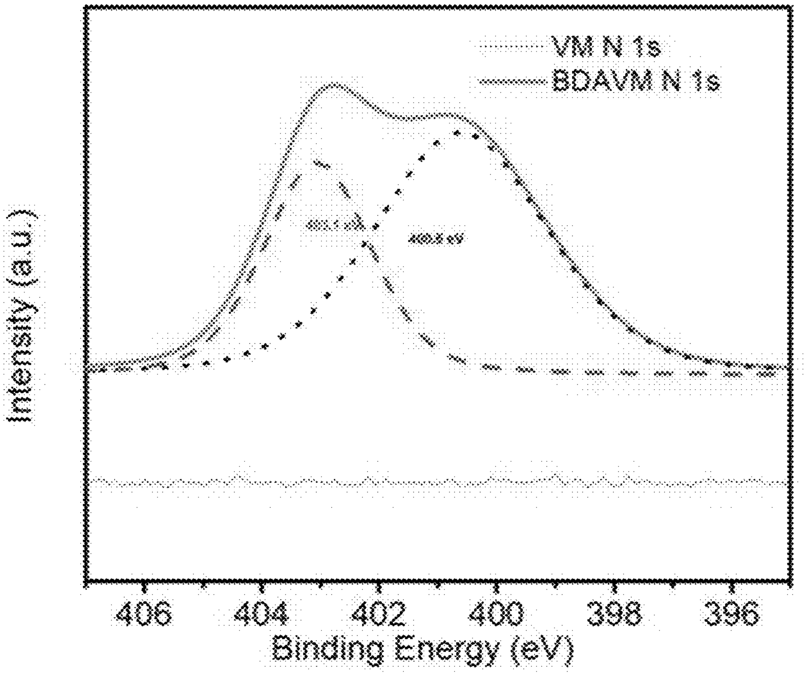
Figure 12B:
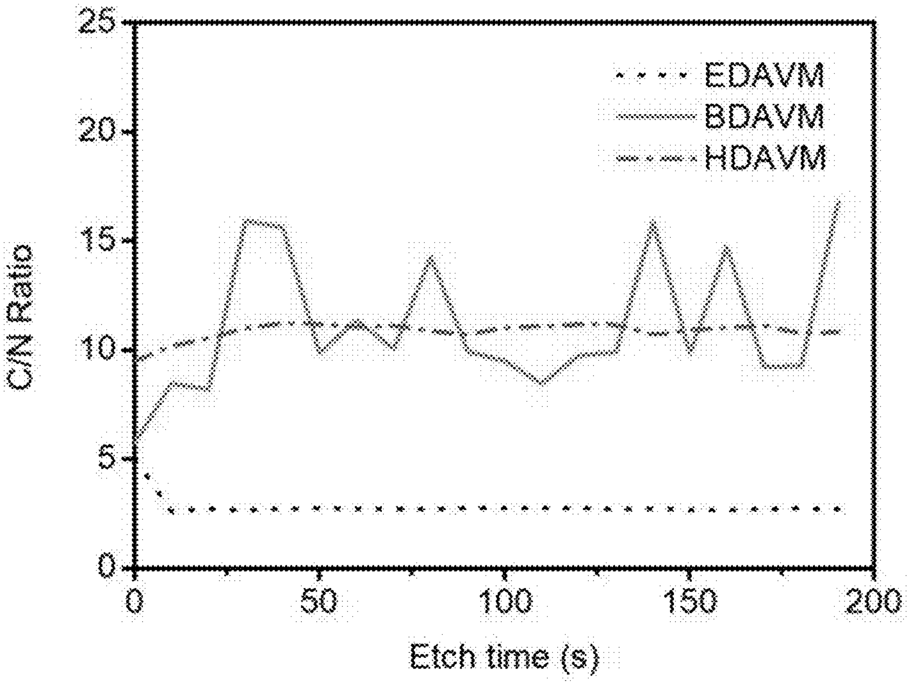
Figure 12C:
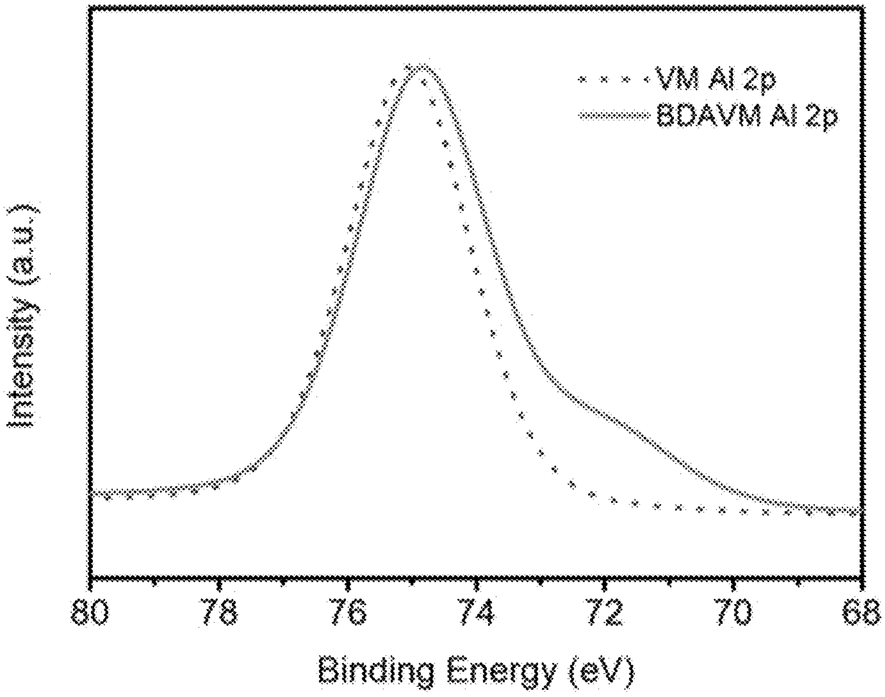
Figure 12D:
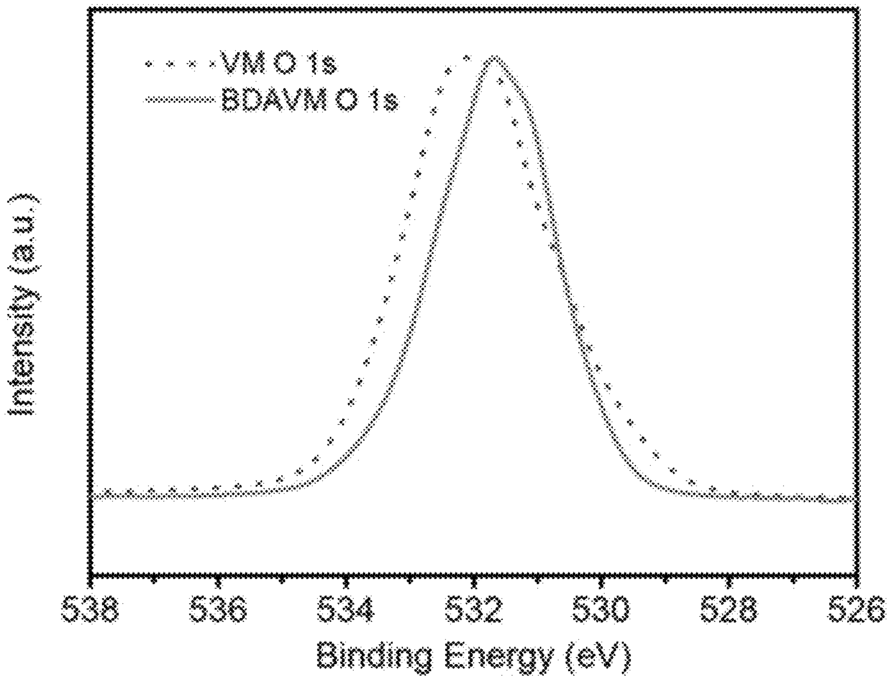

FIG. 12A exhibits the x-ray photoelectron spectroscopy ("XPS") spectra of N 1s of the non-crosslinked vermiculite membrane and butanediamine-crosslinked vermiculite membrane. As can be seen in FIG. 12A, there is no apparent nitrogen peak apparent for the non-crosslinked membrane, whereas the butanediamine-crosslinked membrane indicate substantial presence of diamines. FIG. 12A further shows fitted peaks at 400.6 eV and 403.1 eV, which correspond to C—N and N—O—Al bonding separately. FIG. 12B shows depth profiling of the non-crosslinked vermiculite membrane and butanediamine-crosslinked vermiculite membrane. The depth profiling indicates that the diamines are both at the surface and within the bulk of the crosslinked vermiculite membranes. Based on the XPS elemental analysis, the density of diamines linked to vermiculite interlayer surfaces is approximately 2.4 molecules per $nm^2$. FIGS. 12C-D show high-resolution AL 2p and O1s XPS spectra to further determine the nature of bonding between diamines and vermiculite layers. The Al 2p peak of the butanediamine-crosslinked membrane shifts from 76.6 eV to 75.1 eV and the O 1s peak of the butanediamine-crosslinked membrane shifts from 532.1 to 533.8 eV, which suggests the Al—O in the tetrahedral layers is interacting with the diamine. Although not shown in the figures, the C 1s peak was observed at 284.8 eV for all spectra.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

We claim:

1. A method of producing a cross-linked mineral membrane, the method comprising:

exfoliating, by an ion-exchange process, a phyllosilicate mineral material and restacking layers of the phyllosilicate mineral to produce a membrane; and cross-linking the membrane with a molecular crosslinker comprising a diamine wherein the diamine is ethylendiamine, butanediamine, or hexanediamine.

2. The method of claim 1, wherein the phyllosilicate mineral material is vermiculite.

3. The method of claim 1, wherein the exfoliating, by an ion exchange process, the phyllosilicate mineral material comprises:

refluxing the mineral material in a NaCl solution;

refluxing the mineral material in a LiCl solution;

sonicating and centrifuging the mineral material; and vacuum filtrating or casting the mineral material.

4. The method of claim 3, wherein the molecular crosslinker is introduced into the LiCl solution before vacuum filtrating or casting the mineral material.

5. The method of claim 3, wherein the mineral material is thermally pre-treated prior to refluxing in the NaCl solution.

6. A method of producing a cross-linked mineral membrane, the method comprising:

exfoliating a phyllosilicate mineral material and restacking the layers to produce a membrane;

refluxing the mineral material in a NaCl solution;

refluxing the mineral material in a LiCl solution;

sonicating and centrifuging the mineral material; and vacuum filtrating or casting the mineral material;

wherein a molecular crosslinker is introduced into the LiCl solution before vacuum filtrating or casting the mineral material.

7. The method of claim 6, wherein the phyllosilicate mineral material is vermiculite.

8. The method of claim 7, wherein the molecular crosslinker is a diamine.

9. The method of claim 8, wherein the diamine is ethylendiamine, butanediamine, or hexanediamine.

10. The method of claim 6, wherein the mineral material is thermally pre-treated prior to refluxing in the NaCl solution.

* * * * *